US007647153B2

(12) United States Patent
Sugano

(10) Patent No.: US 7,647,153 B2
(45) Date of Patent: Jan. 12, 2010

(54) METHOD OF CONTROLLING A VEHICLE WHILE OPERATING UNDER A CRUISE CONTROL

(75) Inventor: Takeshi Sugano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 15 days.

(21) Appl. No.: 12/135,746

(22) Filed: Jun. 9, 2008

(65) Prior Publication Data

US 2009/0005949 A1 Jan. 1, 2009

Related U.S. Application Data

(62) Division of application No. 11/033,837, filed on Jan. 13, 2005, now Pat. No. 7,389,172.

(30) Foreign Application Priority Data

Feb. 17, 2004 (JP) ............................. 2004-039284

(51) Int. Cl.
*B60T 7/12* (2006.01)

(52) U.S. Cl. ............................. 701/96; 701/70; 701/91; 701/93; 701/300; 701/301; 342/70; 180/169 B

(58) Field of Classification Search .................. 701/96, 701/300, 70, 91, 93; 123/352; 180/170, 180/169; 340/904; 303/138–139, 199; 342/70
See application file for complete search history.

(56) References Cited

U.S. PATENT DOCUMENTS 6,154,168 A * 11/2000 Egawa et al. .................. 342/71

(Continued)

FOREIGN PATENT DOCUMENTS

DE 10325266 A1 1/2004

(Continued)

OTHER PUBLICATIONS

Cooperative Throttle and Brake Fuzzy Control for ACC+Stop&Go Maneuvers; Naranjo, J.E.; Gonzalez, C.; Garcia, R.; de Pedro, T.; Vehicular Technology, IEEE Transactions on; vol. 56, Issue 4, Part 1, Jul. 2007 pp. 1623-1630 Digital Object Identifier 10.1109/TVT. 2007.897632.*

(Continued)

*Primary Examiner*—Cuong H Nguyen
(74) *Attorney, Agent, or Firm*—Global IP Counselors, LLP

(57) ABSTRACT

A method is provided for controlling a vehicle while operating under a cruise control so as to improve response to driver braking operation and shorten the free running distance by applying a preliminary braking force to a braking device when a preceding vehicle can no longer be recognized during preceding vehicle following control. Basically, the method includes: detecting a preceding vehicle and an inter-vehicle distance to the preceding vehicle from a host vehicle equipped with the vehicle driving control device; executing a preceding vehicle following control to control the inter-vehicle distance to the preceding vehicle towards a target inter-vehicle distance when the preceding vehicle has been recognized; and generating a preliminary braking force upon determination that no preceding vehicle can be recognized during the preceding vehicle following control performed in which the preceding vehicle was previously detected.

6 Claims, 7 Drawing Sheets

U.S. PATENT DOCUMENTS

| | | | |
|---|---|---|---|
| 6,311,120 B1 | 10/2001 | Asada | |
| 6,339,740 B1 * | 1/2002 | Seto et al. | 701/96 |
| 6,345,227 B1 * | 2/2002 | Egawa et al. | 701/96 |
| 6,405,120 B1 * | 6/2002 | Higashimata et al. | 701/96 |
| 6,415,217 B1 * | 7/2002 | Higashimata et al. | 701/96 |
| 6,505,111 B1 * | 1/2003 | Tange et al. | 701/96 |
| 6,618,664 B2 * | 9/2003 | Matsumoto et al. | 701/96 |
| 6,675,094 B2 * | 1/2004 | Russell et al. | 701/301 |
| 6,687,595 B2 * | 2/2004 | Seto et al. | 701/96 |
| 6,708,100 B2 * | 3/2004 | Russell et al. | 701/96 |
| 6,769,504 B2 * | 8/2004 | Kobayashi et al. | 180/169 |
| 6,784,828 B2 * | 8/2004 | Delcheccolo et al. | 342/70 |
| 6,922,624 B2 * | 7/2005 | Isaji et al. | 701/70 |
| 6,993,425 B2 * | 1/2006 | Tange et al. | 701/96 |
| 7,002,452 B2 * | 2/2006 | Watanabe et al. | 340/436 |
| 7,184,889 B2 * | 2/2007 | Isaji et al. | 701/301 |
| 7,200,481 B2 * | 4/2007 | Yamamura et al. | 701/96 |
| 7,252,346 B2 * | 8/2007 | Higuchi | 303/146 |
| 7,257,478 B2 * | 8/2007 | Sugano | 701/96 |
| 7,389,172 B2 * | 6/2008 | Sugano | 701/96 |
| 2003/0026311 A1 * | 2/2003 | Barenburg et al. | 372/50 |
| 2003/0028311 A1 * | 2/2003 | Seto et al. | 701/96 |
| 2003/0154016 A1 | 8/2003 | Manaka | |
| 2003/0195667 A1 * | 10/2003 | Tange et al. | 701/1 |
| 2004/0085197 A1 * | 5/2004 | Watanabe et al. | 340/435 |
| 2005/0182551 A1 | 8/2005 | Sugano | |

FOREIGN PATENT DOCUMENTS

| | | |
|---|---|---|
| DE | 10330922 A1 * | 2/2005 |
| EP | 896896 A2 * | 2/1999 |
| EP | 1072458 A2 | 1/2001 |
| EP | 1081004 A2 | 3/2001 |
| EP | 1095833 A1 | 5/2001 |
| EP | 1251024 A2 * | 10/2002 |
| EP | 1318042 A2 | 6/2003 |
| EP | 1564062 A2 | 8/2005 |
| JP | H09-039754 A | 2/1997 |
| JP | H11-93991 A | 4/1999 |
| JP | H11-192858 A | 7/1999 |
| JP | 2000-110860 A | 4/2000 |
| JP | 2000-309257 A | 11/2000 |
| JP | 2001018681 A * | 1/2001 |
| JP | 2002-059819 A | 2/2002 |
| JP | 2002-211267 A | 7/2002 |
| JP | 2002-367100 A | 12/2002 |
| JP | 2003-054338 A | 2/2003 |
| JP | 2003-118423 A | 4/2003 |
| JP | 2003-205830 A | 7/2003 |
| JP | 2003-327011 A | 11/2003 |
| JP | 3627582 B2 | 12/2004 |
| JP | 2005263098 A * | 9/2005 |
| JP | 2006168509 A * | 6/2006 |
| JP | 2007216776 A * | 8/2007 |
| JP | 2007216777 A * | 8/2007 |
| JP | 2007326399 A * | 12/2007 |
| JP | 2008007062 A * | 1/2008 |
| JP | 2008260528 A * | 10/2008 |
| WO | WO 9829279 A2 * | 7/1998 |
| WO | WO-03-031217 A | 4/2003 |
| WO | WO-2004-005092 A1 | 1/2004 |

OTHER PUBLICATIONS

Development of a Novel Sensorless Longitudinal Road Gradient Estimation Method Based on Vehicle CAN Bus Data; Mangan, S.; Jihong Wang; Mechatronics, IEEE/ASME Transactions on; vol. 12, Issue 3, Jun. 2007 pp. 375-386 Digital Object Identifier 10.1109/TMECH.2007.897286.*

Design on radar signal simulator of automotive ACC; Hai, Si; WenZhang, Zhan; Zhao-du, Liu; Wei, He; Jingliang, Li; Automation and Logistics, 2009. ICAL '09. IEEE International Conference on; Aug. 5-7, 2009 pp. 1450-1453 Digital Object Identifier 10.1109/ICAL.2009.5262726.*

Adaptive cruise control simulator: a low-cost, multiple-driver-in-the-loop simulator; Guvenc, B.A.; Kural, E.; Control Systems Magazine, IEEE, vol. 26, Issue 3, Jun. 2006 pp. 42-55; Digital Object Identifier 10.1109/MCS.2006.1636309.*

Design on radar signal simulator of automotive ACC; Hai, Si; WenZhang, Zhan; Zhao-du, Liu; Wei, He; Jingliang, Li; Automation and Logistics, 2009. ICAL '09. IEEE International Conference on, Aug. 5-7, 2009 pp. 1450-1453 Digital Object Identifier 10.1109/ICAL.2009.5262726.*

Evaluation of adaptive cruise control algorithms on a virtual test track; Donghoon Han; Kyongsu Yi; American Control Conference, 2006; Jun. 14-16, 2006 p. 6 pp.; Digital Object Identifier 10.1109/ACC.2006.1657658.*

Longitudinal vehicle control with the spacing policy in consideration of brake input limits; Yi-Hsien Chiang; Jyh-Ching Juang; Systems, Man and Cybernetics, 2007. ISIC. IEEE International Conference on; Oct. 7-10, 2007 pp. 1705-1710 Digital Object Identifier 10.1109/ICSMC.2007.4413810.*

Integrated headway adaptation with collision avoidance system for intelligent vehicles; Hsin-Han Chiang; Bing-Fei Wu; Tsu-Tian Lee; Jau-Woei Perng; Systems, Man and Cybernetics, 2007. ISIC. IEEE International Conference on; Oct. 7-10, 2007 pp. 3276-3281; Digital Object Identifier 10.1109/ICSMC.2007.4414156.*

Evaluation of Integrated ACC(Adaptive Cruise Control)/CA(Collision Avoidance) on a Virtual Test Track; Donghoon Han; Kyongsu yi; Seungjong Yi; SICE-ICASE, 2006. International Joint Conference, Oct. 18-21, 2006 pp. 2127-2132 Digital Object Identifier 10.1109/SICE.2006.315564.*

Comparison of a linear and a hybrid adaptive cruise controller for a Smart; Corona, D.; De Schutter, B.; Decision and Control, 2007 46th IEEE Conference on, Dec. 12-14, 2007 pp. 4779-4784, Digital Object Identifier 10.1109/CDC.2007.4434054.*

An Architecture for Situation-Aware Driver Assistance Systems; Rockl, M.; Robertson, P.; Frank, K.; Strang, T.; Vehicular Technology Conference, 2007. VTC2007-Spring. IEEE 65$^{th}$, Apr. 22-25, 2007 pp. 2555-2559, Digital Object Identifier 10.1109/VETECS.2007.526.*

A Multilevel Collision Mitigation Approach—Its Situation Assessment, Decision Making, and Performance Tradeoffs; Hillenbrand, J.; Spieker, A.M.; Kroschel, K.; Intelligent Transportation Systems, IEEE Transactions on, vol. 7, Issue 4, Dec. 2006 pp. 528-540; Digital Object Identifier 10.1109-TITS.2006.883115.*

* cited by examiner

METHOD OF CONTROLLING A VEHICLE WHILE OPERATING UNDER A CRUISE CONTROL

CROSS-REFERENCE TO RELATED APPLICATIONS

This application is a divisional application of U.S. patent application Ser. No. 11/033,837 filed on Jan. 13, 2005. The entire disclosure of U.S. patent application Ser. No. 11/033, 837 is hereby incorporated herein by reference. Also this application claims priority to Japanese Patent Application No. 2004-039284. The entire disclosure of Japanese Patent Application No. 2004-039284 is hereby incorporated herein by reference.

BACKGROUND OF THE INVENTION

1. Field of the Invention

The present invention generally relates to a method of controlling a vehicle while operating under a cruise control. More specifically, the present invention relate to a method that generates preliminary braking force prior to the operation of the brakes by the driver, and improves response to driver brake operation and shortens the free running distance.

2. Background Information

In recent years, many vehicles have been equipped with various automatic speed control technologies. For example, an adaptive cruise control system has been disclosed in U.S. Pat. No. 6,311,120 that is capable of executing a following control function. In such an automatic speed control device, when a host vehicle (an ACC vehicle) is traveling in a following control mode in which a host vehicle (an ACC vehicle) is automatically follow a preceding vehicle, the automatic speed control device maintains the host vehicle's distance from the preceding vehicle at a desired inter-vehicle distance. In particular, the automatic speed control device controls the host vehicle's speed so that the host vehicle is automatically accelerated up to a preset vehicle speed, when the preceding vehicle itself changes its traffic lane and disappears from the host vehicle's driving lane. On the other hand, when the preceding vehicle actually exists ahead of the host vehicle but an inter-vehicle distance sensor, employed in the host vehicle, loses the track of the preceding vehicle owing to various factors, for example, curves, slopes, weather or the like, the device disclosed in Japanese Laid-Open Patent Application No. 11-192858 maintains or holds the host vehicle's speed at a vehicle speed given at the time when the preceding vehicle has been lost, until such time that the host vehicle reaches a lost point where the preceding vehicle has been lost, so as to inhibit the automatic accelerating mode from being initiated and to prevent the host vehicle's distance from the preceding vehicle from being reduced inadvertently or undesirably.

There is also known a preliminary braking force control device that generates a preliminary braking force prior to operation of the brakes by the driver, thereby improving response to brake operation by the driver and shortening the free running distance. One such preliminary braking force control device is disclosed in Japanese Laid-Open Patent Application No. 2000-309257.

In view of the above, it will be apparent to those skilled in the art from this disclosure that there exists a need for an improved method of controlling a vehicle while operating under a cruise control. This invention addresses this need in the art as well as other needs, which will become apparent to those skilled in the art from this disclosure.

SUMMARY OF THE INVENTION

So one problem that arises is that when the system of the host vehicle loses sight of a preceding vehicle during preceding vehicle following control, and then a preceding vehicle is again recognized, if the preceding vehicle is decelerating, since no the preliminary braking force is being generated, response to brake application is low, and the host vehicle ends up drawing close to the preceding vehicle.

It has been discovered that in the above-mentioned preliminary braking force control device, the preliminary braking force is generated whenever the distance between vehicles drops below a prescribed distance, or whenever a target deceleration exceeds a set value. Thus, a problem arises in that when the system of the host vehicle loses sight of a preceding vehicle during preceding vehicle following control, and then the preceding vehicle is again recognized, and the preceding vehicle is decelerating. Since no the preliminary braking force is being generated in the above-mentioned preliminary braking force control device, response to a brake operation is slow, and the host vehicle ends up drawing close to the preceding vehicle In view of this problem, the present invention generates a preliminary braking force in a braking device when a preceding vehicle can no longer be recognized during preceding vehicle following control. In accordance with one aspect of the present invention, a method is provided for controlling a vehicle while operating under a cruise control. Basically, the method includes: detecting a preceding vehicle and an inter-vehicle distance to the preceding vehicle from a host vehicle equipped with the vehicle driving control device; executing a preceding vehicle following control to control the inter-vehicle distance to the preceding vehicle towards a target inter-vehicle distance when the preceding vehicle has been recognized; and generating a preliminary braking force upon determination that no preceding vehicle can be recognized during the preceding vehicle following control performed in which the preceding vehicle was previously detected.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
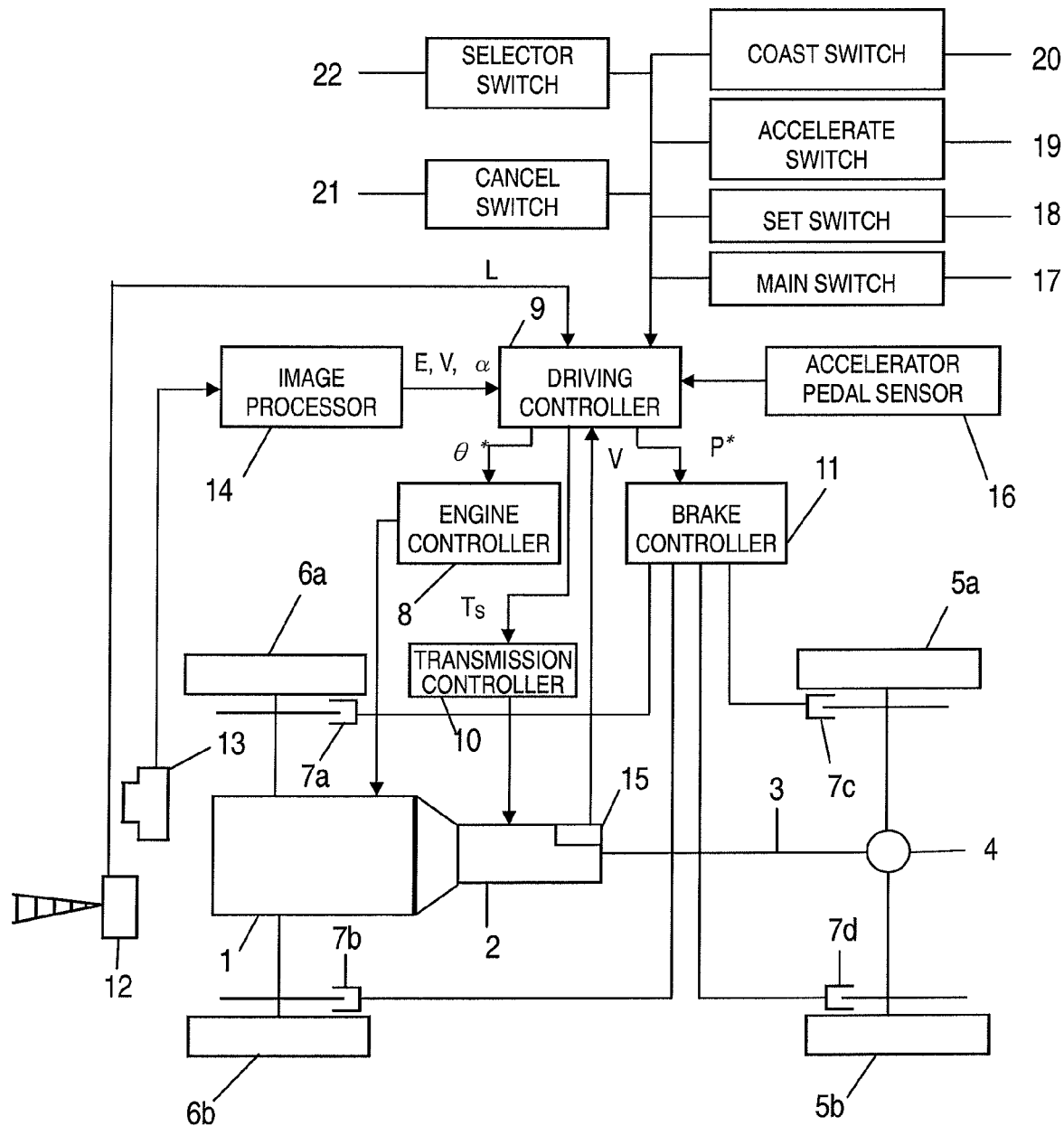
FIG. 1 is a schematic structural diagram of a vehicle equipped with a vehicle driving control device in accordance with one preferred embodiment of the present invention.

Referring initially to FIG. 1, a host vehicle $V_H$ is illustrated equipped with a vehicle driving control device in accordance with a first embodiment of the present invention. The vehicle driving control device is configured with a preceding vehicle following control that includes one or all of functions of a so-called adaptive cruise control (ACC). The phrase "preceding vehicle following control" as used herein refers to performing inter-vehicle distance control and performing vehicle speed control so that an inter-vehicle distance will be substantially maintained to a prescribed or set target value when a preceding vehicle is determined to be present in front of the host vehicle $V_H$, and so that the vehicle speed be substantially maintained to a prescribed or set target value when no preceding vehicle is present.

As explained below, the vehicle driving control device of the present invention is configured and arranged to generate a preliminary braking force in a braking device when a preceding vehicle can no longer be recognized during preceding vehicle following control. The imparting of preliminary braking force referred to in the present invention encompasses imparting a slight braking force that is nearly imperceptible to the driver, as well as not actually imparting braking force, but shortening the free running distance, from the time the driver applies the brakes, that is, from the time the driver steps on the brake pedal, until a braking force is imparted, more than usual. More specifically, to use disc brakes as an example, in the former case above, this refers to a state in which the brake pads touch the discs and squeeze with a very slight force, while in the latter case, this refers to a state in which the brake pads are stopped just at the instant before touching the discs.

In addition to hydraulic braking devices, the braking device in the present invention also includes link-type braking devices that make use of wires or the like, and electric braking devices. Particularly in the case of a hydraulic braking device, preliminary braking force is also called "brake preload," because the preliminary braking force is applied by adjusting the hydraulic pressure.

This host vehicle $V_H$ includes, among other things, an engine 1, an automatic transmission 2, a propeller shaft 3, a final drive 4, a pair of rear drive wheels 5a and 5b, a pair of front driven wheels 6a and 6b, and a plurality of disc brakes 7a to 7d. The engine 1 is a conventional internal combustion engine that acts as a main drive source, which transmits a drive force to the drive wheels 5a and 5b through the automatic transmission 2, the propeller shaft 3, and the final drive 4 in a conventional manner. The wheels 6a, 6b, 5a and 5b are fitted with the disc brakes 7a to 7d, respectively.

The host vehicle $V_H$ further includes, among other things, an engine controller 8, a driving controller 9, a transmission controller 10, a brake controller 11, an inter-vehicle distance sensor 12, a camera 13, an image processor 14, a vehicle speed sensor 15, an accelerator pedal sensor 16 and a plurality of adaptive cruise control inputs 17-22. The vehicle driving control device in accordance with a first embodiment of the present invention preferably includes the components 8-22.

The engine controller 8, the driving controller 9, the transmission controller 10 and the brake controller 11 are preferably part of one or more microcomputers that are configured with control programs that control the host vehicle $V_H$ as discussed below. These controllers 8, 9, 10 and 11 also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for these controllers 8, 9, 10 and 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine 1 is operatively coupled to the engine controller 8. The engine controller 8 controls the torque and speed of the engine 1 by controlling the throttle valve opening, fuel injection, ignition timing, and so forth of the engine 1 according to a throttle valve opening command value $\theta^*$ from the driving controller 9.

The transmission controller 10 controls the gear ratio of an automatic transmission 2 according to a shift command value Ts from the driving controller 9.

The disc brakes 7a to 7d are operatively coupled to the brake controller 11. The brake controller 11 is configured to conduct automatic braking control when the driving controller 9 is conducting the preceding vehicle following control of the adaptive cruise control. The brake controller 11 generates brake hydraulic pressure according to a brake pressure command value P* from the driving controller 9, and supplies this pressure to the disc brakes 7a to 7d. The brake controller 11 also generates brake hydraulic pressure according to a depression amount of a brake pedal detected by the brake pedal sensor (not shown), and supplies this pressure to the disc brakes 7a to 7d.

The inter-vehicle distance sensor 12 is configured and arranged to detect the inter-vehicle distance L between the host vehicle $V_H$ and a preceding vehicle. The inter-vehicle distance sensor 12 is preferably provided on the lower part of the vehicle body at the front of the host vehicle $V_H$. This inter-vehicle distance sensor 12 emits a laser beam, for example, receives the light reflected back from a preceding vehicle, and measures the inter-vehicle distance L between the host vehicle $V_H$ and the preceding vehicle. The inter-vehicle distance sensor 11 also is configured and arranged to detect the position of a preceding vehicle so as to recognize the presence of a preceding vehicle in the host vehicle lane or an adjacent vehicle lane. A scanning or multi-beam type of a laser radar device, a milliwave device, or the like can be used for the inter-vehicle distance sensor 12.

The camera 13 is configured and arranged to obtain images of an area ahead of the host vehicle $V_H$. The camera 13 is provided at a lateral center portion of the host vehicle $V_H$ such as at the top of the windshield inside the passenger compartment. This camera 12 can be a CCD camera, a CMOS camera, or the like.

The image processor 14 is configured and arranged to process the images taken by the camera 13. The image processor 14 is further configured and arranged to detect information about what is ahead of the vehicle, such as road information (e.g., white lines on the road, road slope, road curvature, etc.), and/or preceding vehicle information (e.g., preceding vehicle velocity, preceding vehicle acceleration, preceding vehicle displacement, etc.).

The vehicle speed sensor 15 is configured and arranged to detect the vehicle speed V that based on the rotational output provided on the output side of the automatic transmission 2. The driving controller 9 detects the acceleration a of the host vehicle $V_H$ by differentiating the vehicle speed V detected by the vehicle speed sensor 15.

The adaptive cruise control inputs 17-22 are various conventional switches or controls for performing the preceding vehicle following control. The adaptive cruise control inputs 17-22 are operatively connected to the driving controller 9. The main switch 17 is used for turning the preceding vehicle following control system on and off. The set switch 18 is used for setting the desired vehicle speed. The accelerate switch 19 is used for increasing the set vehicle speed in units of 5 km/h, for instance. The coast switch 20 is used for reducing the set vehicle speed in units of 5 km/h, for instance. The cancel switch 21 is used for canceling preceding vehicle following control. The selector switch 22 is used for changing the set inter-vehicle distance.

and the presence or absence of a preceding vehicle detected by the inter-vehicle distance sensor 12, When a preceding vehicle is present, the driving controller 9 performs inter-vehicle distance control to set the inter-vehicle distance L between the host vehicle $V_H$ and the preceding vehicle to the target value L* based on the host vehicle speed V detected by the vehicle speed sensor 15, the inter-vehicle distance L and the presence or absence of a preceding vehicle detected by the inter-vehicle distance sensor 12 (a preceding vehicle detection section) the various forward road information and/or preceding vehicle information detected by the image processor 14, the set vehicle speed Vset set by the set switch 18, and so forth so. Thus, the inter-vehicle distance L between the host vehicle $V_H$ and the preceding vehicle will be set to the target value L* when the vehicle is traveling at or below the set vehicle speed Vset. When no preceding vehicle is present, the driving controller 9 performs vehicle speed control so that the vehicle speed V will be to the set vehicle speed Vset, such that the driving controller 14 outputs the accelerator pedal opening command value θ* (the result of a control computation) to the engine controller 8 and outputs the brake pressure command value P* (the result of a control computation) to the brake controller 11 to regulate the vehicle speed V.

Figure 2:
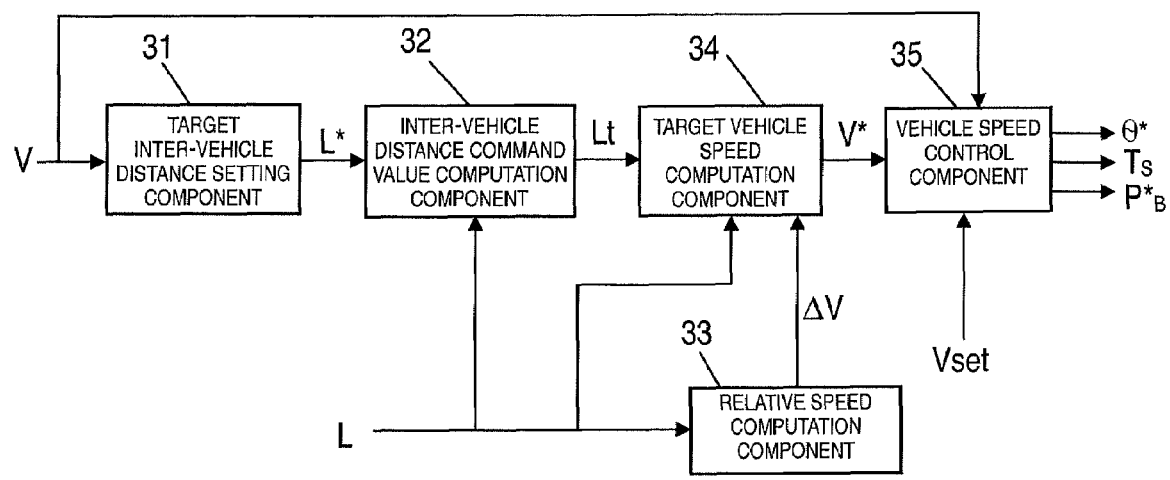
FIG. 2 is a control block diagram illustrating the functions of the driving controller of the vehicle driving control device in accordance with one preferred embodiment of the present invention.

FIG. 2 is a control block diagram illustrating the functions of the driving controller 9. The driving controller 9 comprises a target inter-vehicle distance setting component 31, an inter-vehicle distance command value computation component 32, a relative speed computation component 33, a target vehicle speed computation component 34, and a vehicle speed control component 35 (all in the form of software loaded installed in a microcomputer).

The target inter-vehicle distance setting component 31 is configured to set the target inter-vehicle distance L* according to the host vehicle speed V by the following Equation (1).

$$L^* = V^* T_0 + L_0 \quad (1)$$

In Equation (1), the term "$T_0$" is the inter-vehicle time, while the term "$L_0$" is the inter-vehicle distance when the vehicles are stopped. The target inter-vehicle distance L* can also be set according to the vehicle speed Vt of the preceding vehicle, rather than the host vehicle speed V.

The inter-vehicle distance command value computation component 32 is configured to compute the inter-vehicle distance command value Lt which is expresses as the change over time in the inter-vehicle distance until the inter-vehicle distance L reaches the target value L*. More specifically, the target inter-vehicle distance L* is subjected to a low-pass filter Ft(s) given by the following Equation (2), and the inter-vehicle distance command value Lt is computed.

$$Ft(s) = \omega^2 / (s^2 + 2\zeta\omega s + \omega) \quad (2)$$

In Equation (2), the terms "ω" and "ζ" are a characteristic frequency and an attenuation coefficient, respectively, for converting the response characteristics in the inter-vehicle distance control system into the targeted response characteristics. The term "s" is a differentiation operator.

The relative speed computation component 33 is configured to compute the relative speed ΔV versus the preceding vehicle based on the inter-vehicle distance L from the preceding vehicle detected by the inter-vehicle distance sensor 12. More specifically, the inter-vehicle distance L is subjected to a bandpass filter Fd(s) given by the following Equation (3), and the relative speed ΔV is computed.

$$Fd(s) = \omega c^2 s / (s^2 + 2\zeta c \omega cs + \omega c^2) \quad (3)$$

In Equation (3), term "ωc" is a characteristic frequency, term "ζc" is an attenuation coefficient, and these terms are determined by the magnitude of the noise component included in the inter-vehicle distance L, and by the permissible fluctuation in short-period body longitudinal acceleration. The term "s" is a differentiation operator. The relative speed ΔV can also be computed by subjecting the inter-vehicle distance L to a high-pass filter instead of a bandpass filter.

The target vehicle speed computation component 34 is configured to compute the target vehicle speed V* for matching the inter-vehicle distance L to the inter-vehicle distance command value Lt by using a feedback compensator. More specifically, the target vehicle speed V* is computed based on the relative speed ΔV and the inter-vehicle distance L versus the preceding vehicle by the following Equation (4).

$$V^* = Vt - \{fd(Lt - L) + fv^* \Delta V\} \quad (4)$$

In Equation (4), term "fd" is the distance control gain, term "fv" is the vehicle speed control gain, and term "Vt" is the preceding vehicle speed (Vt=V+ΔV).

The vehicle speed control component 35 is configured to compute a target braking force $F_0 r$ for matching the vehicle speed V to the target vehicle speed V* or the set vehicle speed Vset. The vehicle speed control component 35 is also configured to determine the throttle valve opening command value θ* the gear ratio command value Ts, and the braking pressure command value P* based on the target braking force $F_0 r$, and then output the result to the engine controller 8, the transmission controller 10, and the brake controller 11.

Figure 3:
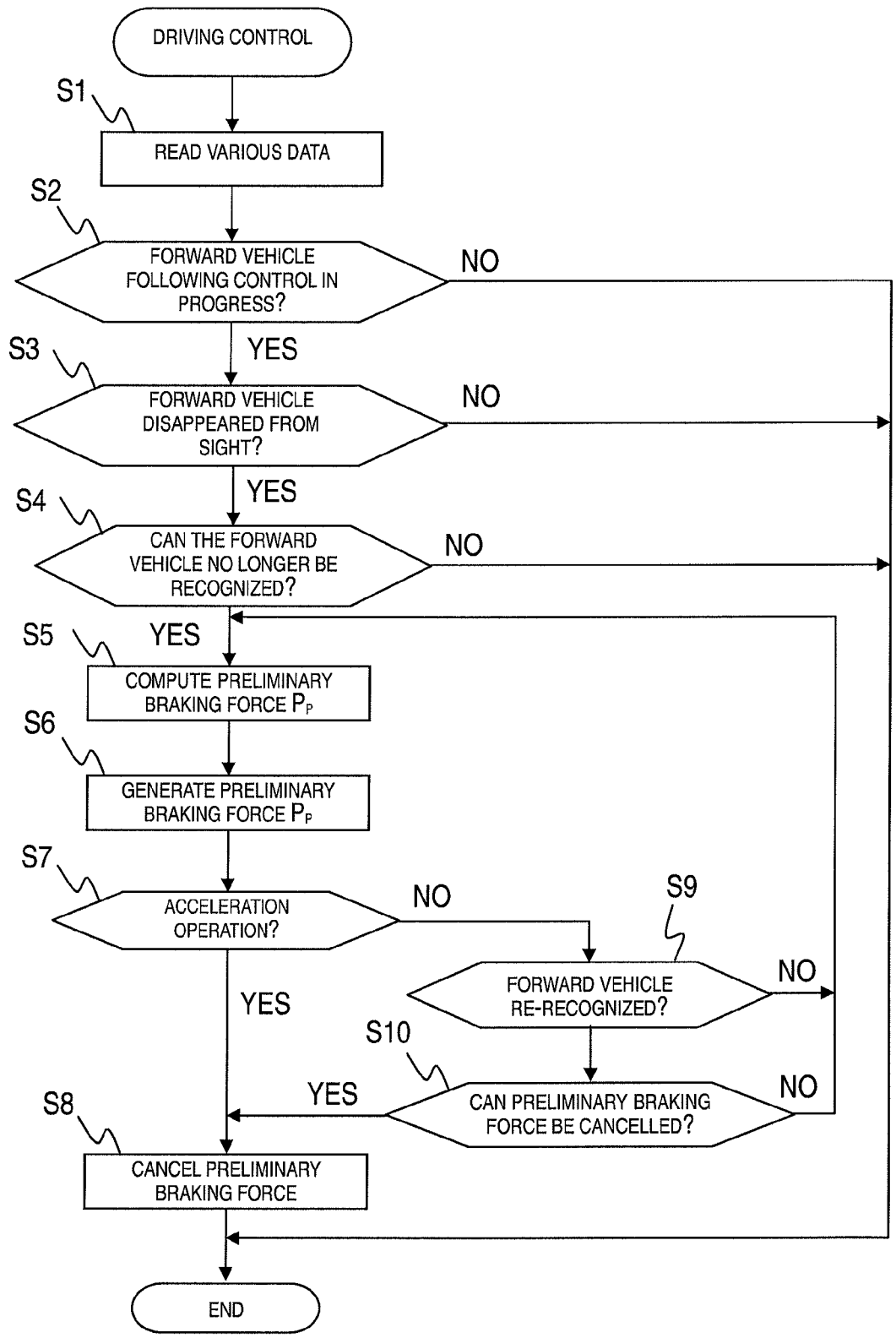
FIG. 3 is a flowchart illustrating the driving control program executed by the vehicle driving control device in accordance with one preferred embodiment of the present invention.

FIG. 3 is a flowchart illustrating the driving control program in a first embodiment. This flowchart will be used to describe the operation in the first embodiment. The driving controller 9 executes th the driving control program shown in FIG. 3 every 10 msec, for instance, when the main switch 17 of the adaptive cruise control inputs is turned on.

In step S1, the various data needed for driving control is read by the driving controller 9. This data includes, among other things the operation status of the adaptive cruise control inputs or switches 17-22, whether a preceding vehicle is present in the host vehicle lane and the inter-vehicle distance L as detected by the inter-vehicle distance sensor 12, preceding road information and/or preceding vehicle information detected by the camera 12 and the image processor 13, the vehicle speed V detected by the vehicle speed sensor 15, the amount of accelerator pedal operation detected by an accelerator pedal sensor 16, and so forth.

In step S2, the driving controller 9 determines whether or not preceding vehicle following control is in progress. If the main switch 17 is on and a preceding vehicle has been recognized, then inter-vehicle distance control is performed so that the inter-vehicle distance L to the preceding vehicle will be the target value L*. When preceding vehicle following control is in progress, the program proceeds to step S3, but if preceding vehicle following control is not in progress, processing is concluded.

In step S3, the driving controller 9 determines whether the system has lost sight of the preceding vehicle. In this embodiment, even though a preceding vehicle in the host vehicle lane is recognized by the inter-vehicle distance sensor 12, and the inter-vehicle distance L to that preceding vehicle has been detected, if the preceding vehicle in the host vehicle lane can suddenly no longer be recognized, and the inter-vehicle distance L cannot be detected, the driving controller 9 determines that the system has lost sight of the preceding vehicle. If the preceding vehicle has disappeared from sight, the program proceeds to step S4, and if a preceding vehicle can still be recognized, processing is concluded.

Figure 4A:
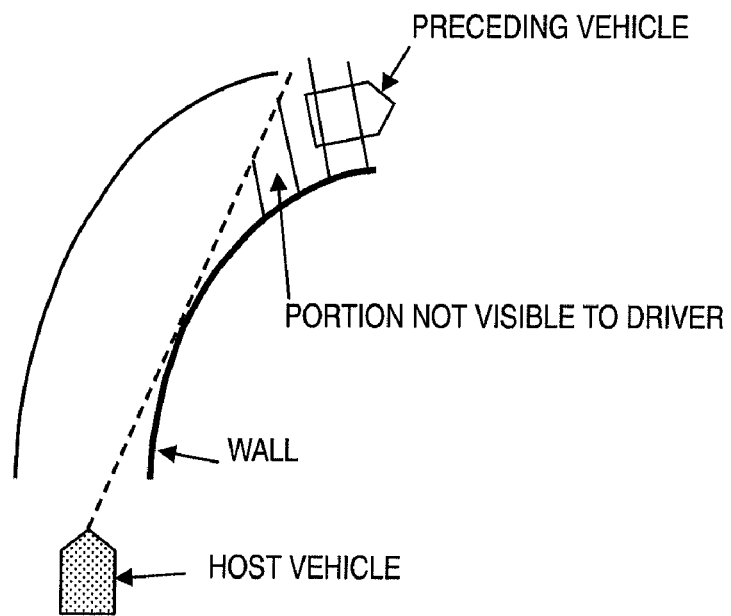
FIG. 4A is a top plan view of a diagram illustrating how a preceding vehicle is lost from sight of a host vehicle after the preceding vehicle has gone around a curve with a wall.
Figure 4B:
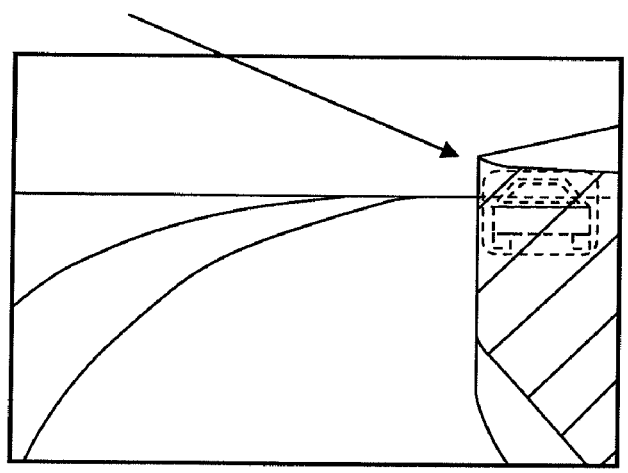
FIG. 4B is an elevational view of a view from the host vehicle in FIG. 4A illustrating how a preceding vehicle is lost from sight of a host vehicle after the preceding vehicle has gone around a curve with a wall.

In step S4, the driving controller 9 determines whether or not the preceding vehicle is no longer visible. A preceding vehicle may become invisible when blocked by a building while crossing an intersection or going around a curve, or may become invisible upon cresting the top of a hill. Alternatively, a preceding vehicle may become invisible because it has passed a parked vehicle ahead. FIG. 4A shows the situation when a preceding vehicle is blocked by a wall and cannot be seen from the host vehicle $V_H$ after going around a curve with a wall. FIG. 4B is the image showing what is ahead of the host vehicle, taken by the camera 13, in the situation shown in FIG. 4A. The image processor 14 processes the image taken by the camera 13, and detects whether a preceding vehicle is present in the image. Then the driving controller 9 determines from the processing by the image processor 14 whether or not the preceding vehicle has disappeared from sight. When a preceding vehicle that had been detected up to that point vanishes from the image, the driving controller 9 determines the preceding vehicle has disappeared from sight.

Even if the inter-vehicle distance sensor 12 has lost sight of the preceding vehicle, if the preceding vehicle can be detected by the camera 13 and the image processor 14, then processing is concluded without generating a preliminary braking force. The camera 13 and the image processor 14 assume the role of the driver's eyes, and there is little need to generate a preliminary braking force when a preceding vehicle is present without the camera image, that is, the driver's field of vision, even if the inter-vehicle distance sensor 12 has lost sight of the preceding vehicle. A situation such as this can occur, for example, when the host vehicle or the preceding vehicle makes a sudden lane change.

Meanwhile, when the inter-vehicle distance sensor 12 loses sight of the preceding vehicle, and the camera 13 and the image processor 14 also lose sight of the preceding vehicle, the program proceeds to step S5 in order to generate a preliminary braking force. In step S5, the preliminary braking force $P_p$ is computed.

Then in step S6, an actuator is driven by the brake controller 11 to generate the preliminary braking force $P_p$. As a result, when a preceding vehicle that has disappeared from sight during preceding vehicle following control is discovered again, a braking force can be generated without delay with respect to the brake operation by the driver since the preliminary braking force has already been generated. Thus, the brakes 7a to 7d respond more quickly to braking operation so that braking is improved and the free running distance is shortened even if the discovered preceding vehicle is decelerating.

In step S7 after the preliminary braking force $P_p$ has been applied, the driving controller 9 determines if an accelerate operation has been performed by using the accelerator pedal sensor 16 to detect if the accelerator pedal has been depressed, or by detecting if the set vehicle speed Vset has been increased with the accelerate switch 19. If an accelerate operation has been performed, the program proceeds to step S8, and an actuator is driven by the brake controller 11 to cancel the preliminary braking force $P_p$. This allows vehicle behavior to be obtained in accordance with the intentions of the driver. If in step S7, the driver has not performed an accelerator operation, the driving controller 9 proceeds to step S9.

In step S9, the driving controller 9 determines if a preceding vehicle has been re-recognized by the inter-vehicle distance sensor 12 or by the camera 13 and the image processor 14, and if a preceding vehicle still cannot be re-recognized, the program proceeds to step S5, and the generation of the preliminary braking force $P_p$ is continued as discussed above.

On the other hand, if in step S9, a preceding vehicle has been re-recognized, the program proceeds to step S10, where the driving controller 9 determines whether or not preload can be canceled. In this embodiment, whether or not preload is canceled is determined on the basis of the inter-vehicle distance L and the relative speed Δv versus the re-recognized preceding vehicle.

Figure 5:
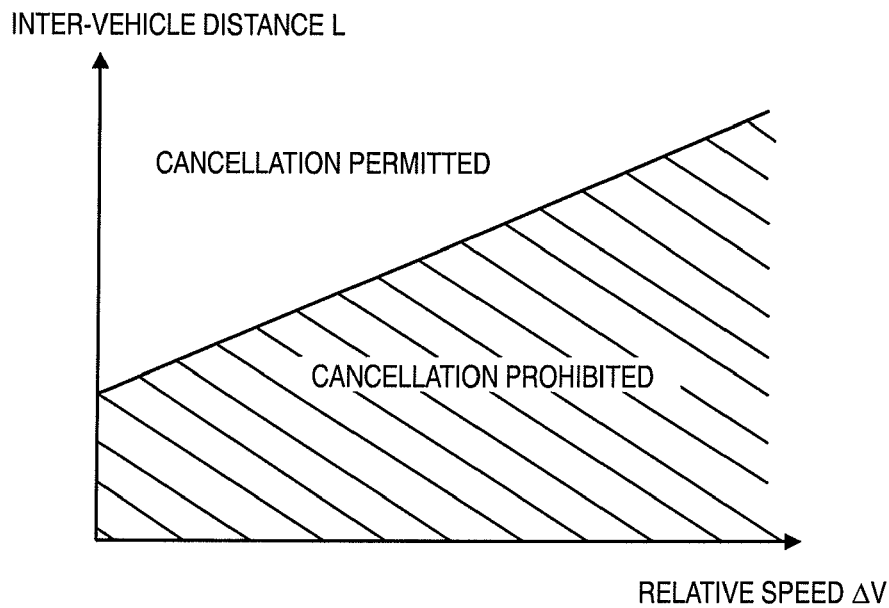
FIG. 5 is an example of a preload cancellation determination map used by the vehicle driving control device for determining if the preliminary braking force should be cancelled.

FIG. 5 is an example of a preliminary braking force cancellation determination map, produced from the relative speed Δv and the inter-vehicle distance L. In this two-dimensional map, in which the horizontal axis is the relative speed Δv, while the vertical axis is the inter-vehicle distance L. When the host vehicle is moving faster than the preceding vehicle and is gaining on the preceding vehicle, then cancellation of the preliminary braking force is prohibited if the point determined by the relative speed Δv and the inter-vehicle distance L falls within the shaded region of the preliminary braking force cancellation determination map. That is, cancellation of the preliminary braking force is prohibited when the relative speed Δv is higher and the inter-vehicle distance L is shorter. Conversely, even if the relative speed Δv is high, then the cancellation of the preliminary braking force will be permitted if the inter-vehicle distance L is adequate. Consequently, when a re-recognized preceding vehicle is decelerating, the relative speed Δv will be high and the inter-vehicle distance L will be short, so cancellation of the preliminary braking force is prohibited, and braking force can be generated without delay with respect to the driver's operation of the brakes. Thus, the brakes 7a to 7d respond more quickly to braking operation so that braking is improved and the free running distance is shortened. Conversely, if the inter-vehicle distance L is sufficiently long, cancellation of the preliminary braking force will be permitted, so normal preceding vehicle following control can be performed.

If cancellation of the preliminary braking force was permitted in step S10, the program proceeds to step S8, where an actuator is driven by the brake controller 11 to cancel the preliminary braking force $P_p$. On the other hand, if the cancellation of the preliminary braking force was prohibited, the program proceeds to step S5 and the generation of the preliminary braking force $P_p$ is continued.

Figure 6:
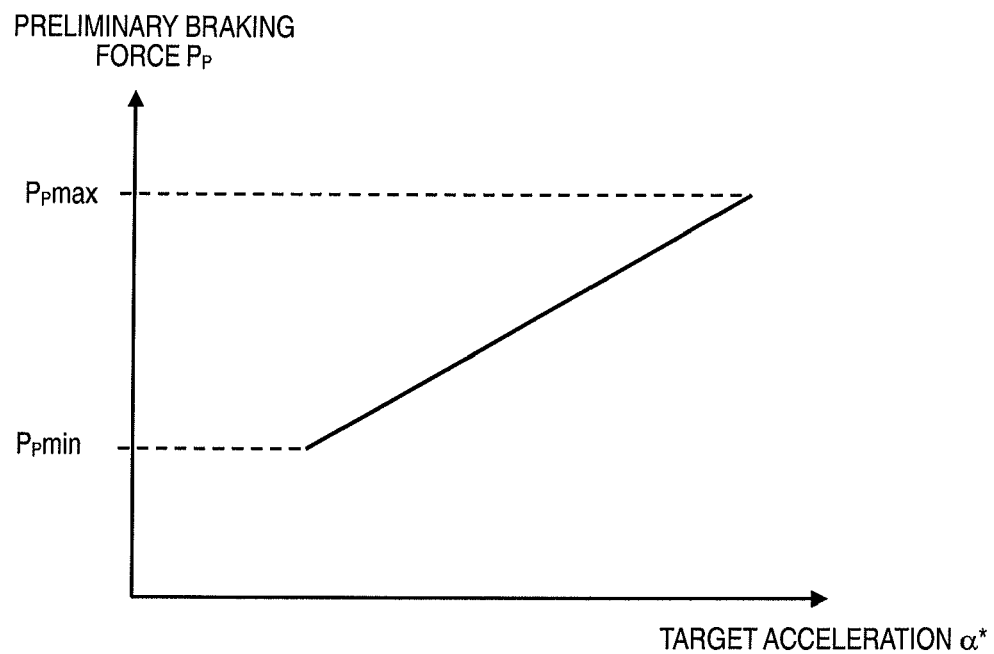
FIG. 6 is a graph plotting the preliminary braking force versus target acceleration.

Methods for calculating the preliminary braking force $P_p$ by the driving controller 9 will now be described. The first calculation method is one in which the preliminary braking force $P_p$ is raised in inverse proportion to the target acceleration of the host vehicle. When a preceding vehicle is lost sight of, the host vehicle accelerates to the set vehicle speed Vset if the host vehicle speed V is lower than the set vehicle speed Vset. The target acceleration $\alpha^*$ here is assumed to be decided according to the vehicle speed when the preceding vehicle has disappeared from sight, for example, and is mapped out ahead of time. As shown in FIG. 6, the preliminary braking force $P_p$ is raised in proportion to the target acceleration $\alpha^*$ during acceleration to the set vehicle speed Vset. Consequently, the preliminary braking force suited to the difference in free running distance can be generated without delay even if the acceleration of the host vehicle is high. The relation between the target acceleration $\alpha^*$ and the preliminary braking force $P_p$ need not be linear as shown in FIG. 6.

Figure 7:
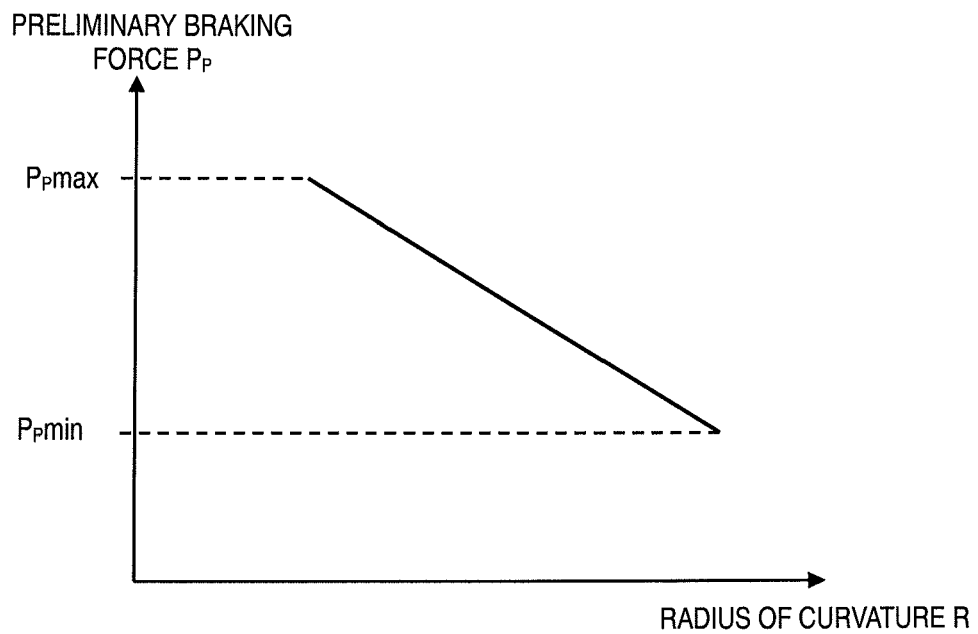
FIG. 7 is a graph plotting the preliminary braking force versus radius of curvature that is used for calculating the preliminary braking force.

The second calculation method involves raising the preliminary braking force $P_p$ in inverse proportion to the radius of curvature of a curved road. The smaller is the radius of curvature of a curved road, the closer the host vehicle has to be to a preceding vehicle to re-recognize a preceding vehicle that has gone out of sight. In a case such as this, if the preceding vehicle brakes and decelerates suddenly, the host vehicle may get too close to the preceding vehicle and have to brake suddenly as well. In view of this, as shown in FIG. 7, the preliminary braking force $P_p$ is raised in inverse proportion to the radius of curvature R of a curved road. As a result, when a preceding vehicle that has disappeared from sight has been re-recognized, the braking force corresponding to the braking requirements can be generated without delay. The relation between the radius of curvature R and the preliminary braking force $P_p$ need not be linear as shown in FIG. 7. The radius of curvature R of a curved road can be estimated from the yaw rate or steering angle of the host vehicle, or can be estimated by detecting a delineator disposed on the roadside, for example.

Figure 8:
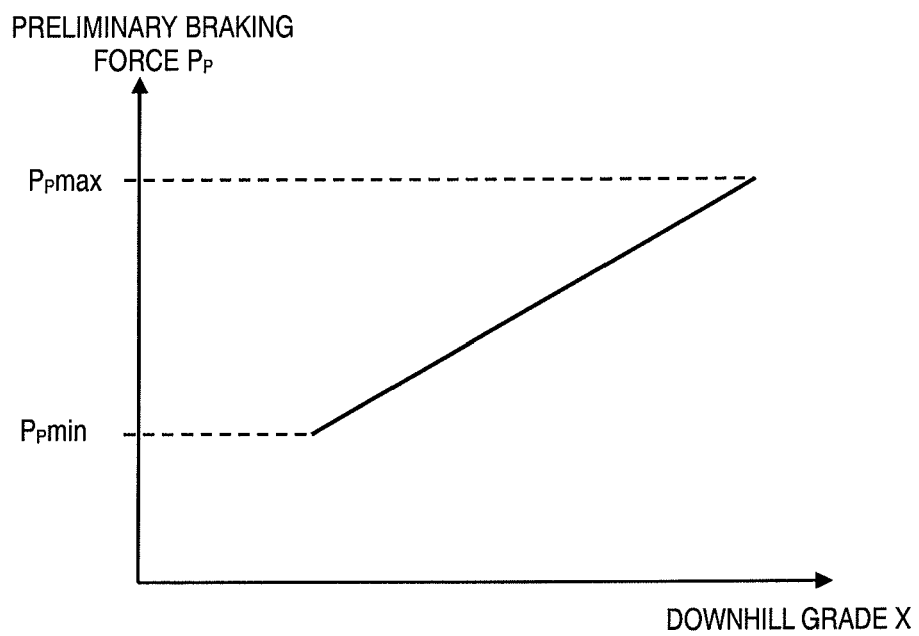
FIG. 8 is a graph plotting the preliminary braking force versus downhill grade that is used for calculating the preliminary braking force.

The third calculation method involves raising the preliminary braking force $P_p$ in proportion to the downhill grade. When a preceding vehicle disappears from sight, the host vehicle accelerates to the set vehicle speed Vset if the host vehicle speed V is lower than the set vehicle speed Vset. Since speed response improves in proportion to the steepness of the downhill grade, if a preceding vehicle that has disappeared from sight suddenly brakes and decelerates, the host vehicle may get too close to the preceding vehicle and have to brake suddenly as well. In view of this, as shown in FIG. 8, the preliminary braking force $P_p$ is raised in proportion to the downhill grade X. As a result, the preliminary braking force $P_p$ that is suited to the difference in acceleration result from the downhill grade X can be generated. The relation between the downhill grade X and the preliminary braking force $P_p$ need not be linear as shown in FIG. 8. The downhill grade X can be detected by a vehicle attitude detection sensor, or can be obtained as road information from a navigation device, for example.

Figure 9:
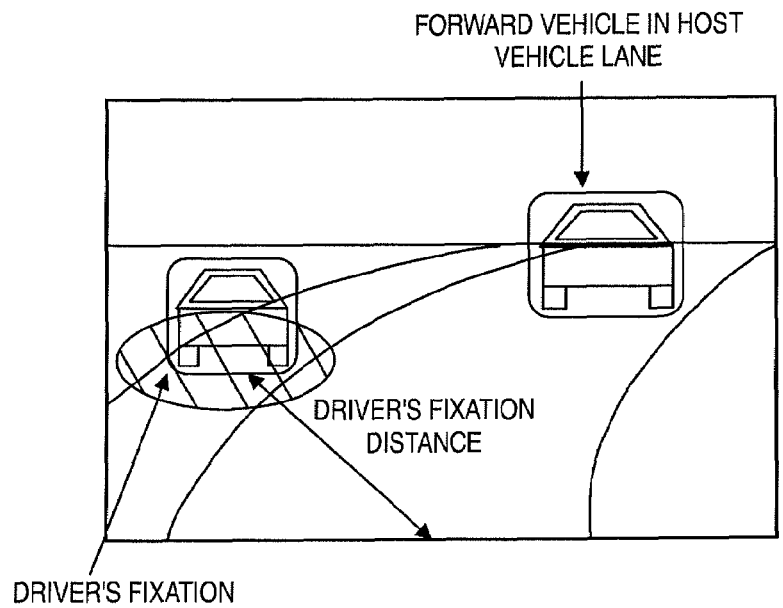
FIG. 9 is a graph plotting the fixation distance and fixation range of the driver that is used for calculating the preliminary braking force.

The fourth calculation method involves raising the preliminary braking force $P_p$ in inverse proportion the attention being paid by the driver to the preceding vehicle. The fixation point of the driver is detected, and the fixation distance, fixation range, fixation frequency, etc., of the driver is detected as shown in FIG. 9. FIG. 9 shows the situation when the driver's fixation range is on a vehicle traveling in an adjacent lane, and the driver is not looking at the preceding vehicle in the host vehicle lane.

The fixation point of the driver can be detected, for example, by projecting infrared light onto the face of the driver, capturing an image of the driver's face with an infrared camera, subjecting the captured image to image processing such as digitization or characteristic feature extraction, and detecting the driver's nostrils, the inner and outer corners of the eye, the position of the pupil, and the position of the reflection points generated at the cornea of the eyeball by projection of infrared light. Then, the direction in which the drivers' face is oriented is directed on the basis of these detection results, and the direction of the driver's line of sight is detected on the basis of the corneal reflection points and the direction in which the driver's face is oriented. The fixation point in the direction of the driver's line of sight is then detected on the basis of the positional relationship between the space inside and outside the vehicle and the driver's face (prestored in memory). The method for detecting the fixation point of the driver is not limited to the method discussed above.

Figure 10:
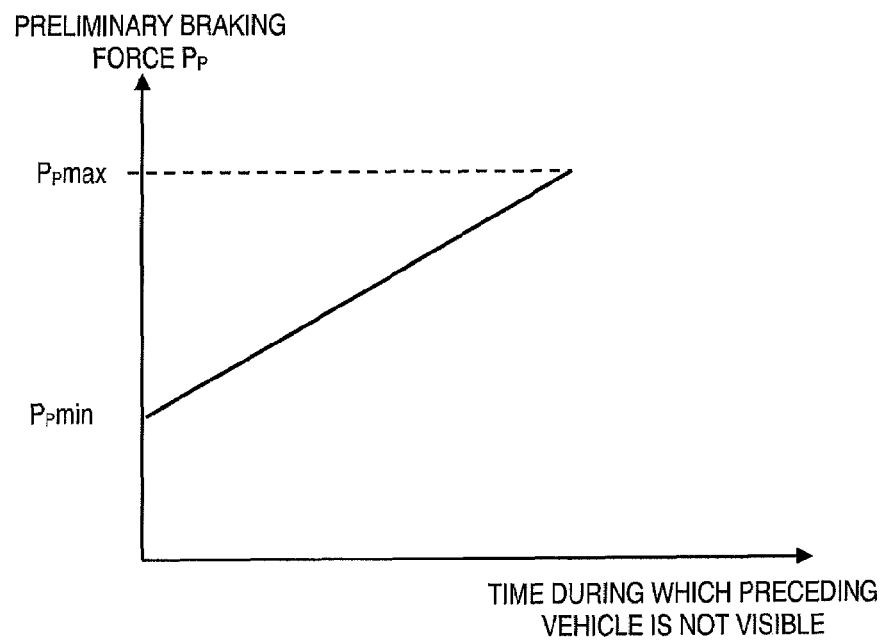
FIG. 10 is a graph plotting the preliminary braking force versus how long the driver has not been looking at the preceding vehicle that is used for calculating the preliminary braking force.

Whether or not the driver was looking at the preceding vehicle before the driver lost sight of the preceding vehicle, and how long the driver has been looking away from the vicinity of the preceding vehicle, are detected on the basis of the driver's fixation point information and information such as a preceding vehicle and white lines ahead of the vehicle detected by the camera 13 and the image processor 14. If the driver was not looking at the preceding vehicle just before the preceding vehicle disappeared from sight, the preliminary braking force $P_p$ is raised by multiplying the preliminary braking force $P_p$ by a coefficient K (such as 1.2). The preliminary braking force $P_p$ can also be raised in proportion to how long the driver was not looking at the preceding vehicle before the preceding vehicle disappeared from sight, as shown in FIG. 10.

When the attention of the driver with regard to the preceding vehicle has decreased, it is more likely that a decision to apply the brakes will be late, so the attention of the driver with regard to the preceding vehicle is estimated from the driver's fixation point information and the information about what is ahead of the vehicle provided by the camera image, the preliminary braking force $P_p$ is raised in proportion to how much the driver's attention to the preceding vehicle is judged to have decreased because of looking to the side, etc., and a preliminary braking force that is suited to the delayed decision to apply the brakes can be achieved.

In the embodiment discussed above, the preceding vehicle was considered to have disappeared from sight when the inter-vehicle distance sensor 12 lost sight of the preceding vehicle and no preceding vehicle could be detected in the host vehicle lane by the camera 13 and the image processor 14. This makes it possible to accurately determine that the preceding vehicle has disappeared from sight, and the unnecessary generation of the preliminary braking force can be avoided. However, just the inter-vehicle distance sensor 12 can be used to detect that the preceding vehicle has disappeared from sight, without installing the expensive camera 13 and image processor 14, and this allows the device to be less expensive.

Also, a hydraulic braking device was used in the above embodiment, but the present invention is not limited to a hydraulic braking device, and an electric braking device or a link-type braking device can be used instead. With an electric braking device, preliminary braking force can be imparted by adjusting the current flowing to the electric motor. Electric braking devices have been disclosed in Japanese Laid-Open Patent Applications H11-093991 and 2000-110860, for example, and the braking devices disclosed in these patent documents can be applied to the present invention. Also, with a link-type braking device in which the brake pedal and the brakes are linked with wires, for example, an actuator that drives the wires can be provided at some point along the link, and the preliminary braking force imparted by controlling the drive of this actuator. Furthermore, the braking device in the present invention may be either a disc brake or drum brake system.

In the illustrated embodiments, the constituent elements of the claims and the constituent elements of the embodiments are in the following corresponding relationships. The inter-vehicle distance sensor 12 constitutes the inter-vehicle distance detection section. The driving controller 9 constitutes the preceding vehicle following control section. The driving controller 9 also constitutes the preliminary braking force control section. The driving controller 9 also constitutes at least one of the radius of curvature estimation section, the downhill grade detection section and the visual fixation point detection section. The driving controller 9 further constitutes the preceding vehicle fixation point determination section. The camera 13 and the image processor 14 constitute the preceding vehicle detection section. The accelerator pedal sensor 16 and the accelerate switch 19 constitute the acceleration operation detection section. The various constituent elements are not limited to the above constitution, as long as the characteristic function of the present invention is not lost.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of controlling a vehicle while operating under a cruise control comprising:
   detecting a preceding vehicle and an inter-vehicle distance to the preceding vehicle from a host vehicle equipped with the vehicle driving control device;
   executing a preceding vehicle following control to control the inter-vehicle distance to the preceding vehicle towards a target inter-vehicle distance when the preceding vehicle has been recognized; and
   generating a preliminary braking force upon determination that no preceding vehicle can be recognized during the preceding vehicle following control performed in which the preceding vehicle was previously detected.

2. The method according to claim 1, further comprising controlling a host vehicle speed to a set vehicle speed when the preceding vehicle can no longer be recognized by the inter-vehicle distance detection section, and
   increasing the preliminary braking force in proportion to an acceleration when the host vehicle accelerates to the set vehicle speed.

3. The method according to claim 1, further comprising estimating a radius of curvature of a road on which the host vehicle is traveling based on data indicative of a curve in the road; and
   increasing the preliminary braking force in inverse proportion to the radius of curvature that was estimated.

4. The method according to claim 1, further comprising detecting a downhill grade of a downhill road; and
   increasing the preliminary braking force in proportion to the downhill grade that was detected.

5. The method according to claim 1, further comprising detecting a visual fixation point of a driver;
   obtaining an image of an area ahead of the host vehicle;
   processing the image to detecting a preceding vehicle position;
   determining if the driver was looking at the preceding vehicle position before the preceding vehicle could no longer be recognized, based on of the visual fixation point of the driver that was detected and the preceding vehicle position that was detected; and
   increasing the preliminary braking force upon determining that the driver was not looking at the preceding vehicle position before the preceding vehicle could no longer be recognized.

6. The method according to claim 1, further comprising obtaining an image of an area ahead of the host vehicle;
   processing the image to detect the preceding vehicle in the image; and
   generating the preliminary braking force when the preceding vehicle is no longer detected in the image and the preceding vehicle can no longer be recognized during execution of the preceding vehicle following control.

* * * * *